(12) United States Patent
Hatton et al.

(10) Patent No.: US 7,689,724 B1
(45) Date of Patent: Mar. 30, 2010

(54) APPARATUS, SYSTEM AND METHOD FOR SHARING DATA FROM A DEVICE BETWEEN MULTIPLE COMPUTERS

(75) Inventors: Barry Sullivan Hatton, Escondido, CA (US); David Gordon Wright, Escondido, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1062 days.

(21) Appl. No.: 10/222,155

(22) Filed: Aug. 16, 2002

(51) Int. Cl.
*G06F 15/16* (2006.01)
*G06F 13/20* (2006.01)
(52) U.S. Cl. ...................... 709/253; 710/313
(58) Field of Classification Search ............... None
See application file for complete search history.

(56) References Cited

U.S. PATENT DOCUMENTS

| | | |
|---|---|---|
| 3,800,090 A | 3/1974 | Matena |
| 3,810,120 A | 5/1974 | Huettner et al. |
| 3,864,670 A | 2/1975 | Inoue et al. |
| 3,950,735 A | 4/1976 | Patel |
| 4,007,449 A | 2/1977 | Vercesi |
| 4,195,351 A | 3/1980 | Barner et al. |
| 4,419,723 A | 12/1983 | Wilson, Jr. |
| 4,445,976 A | 5/1984 | Yokoyama |
| 4,481,625 A | 11/1984 | Roberts et al. |
| 4,626,697 A | 12/1986 | Nelson |
| 4,641,261 A | 2/1987 | Dwyer et al. |
| 4,689,740 A | 8/1987 | Moelands et al. |
| 4,775,807 A | 10/1988 | Bukowski, Jr. |

(Continued)

FOREIGN PATENT DOCUMENTS

JP        01279630 A1    11/1989

(Continued)

OTHER PUBLICATIONS de Almeida Pereira Zuquim, Ana Luiza et al. "An Embedded Converter from RS232 to Univeral Serial Bus," Sep. 2001, IEEE, pp. 91-96.*

(Continued)

*Primary Examiner*—Patrice Winder
*Assistant Examiner*—Azizul Choudhury

(57) ABSTRACT

An apparatus, system and method of sharing device data from a peripheral device by at least a first and a second computer where the peripheral device coupled with the first computer. The apparatus includes a device emulator coupled between the first computer and the second computer, the device emulator adapted to pass the device data from the first computer to the second computer in a format used by the peripheral device. Device data is received at the first computer, and it is determined whether the device data should be processed by the first computer, and the device data is passed to the device emulator for transmission to the second computer. In a method implementation, the determining operation may examine whether the first computer is the intended target of device data. The device data may be received at the device emulator and the device data may be encoded in a format used by the peripheral device, and transmitted in the format to the second computer. In this manner, the data from the device is shared by the first and second computers, as if the second computer has been connected to the device.

6 Claims, 5 Drawing Sheets

U.S. PATENT DOCUMENTS

| | | |
|---|---|---|
| 4,862,355 A | 8/1989 | Newman et al. |
| 4,872,107 A | 10/1989 | Marple et al. |
| 5,126,548 A | 6/1992 | Sekiguchi |
| 5,175,451 A | 12/1992 | Ihara |
| 5,230,071 A | 7/1993 | Newman |
| 5,282,166 A | 1/1994 | Ozaki |
| 5,289,580 A | 2/1994 | Latif et al. |
| 5,300,837 A | 4/1994 | Fischer |
| 5,404,480 A | 4/1995 | Suzuki |
| 5,428,748 A | 6/1995 | Davidson et al. |
| 5,434,533 A | 7/1995 | Furutani |
| 5,467,009 A | 11/1995 | McGlinchey |
| 5,471,524 A | 11/1995 | Colvin et al. |
| 5,475,271 A | 12/1995 | Shibasaki et al. |
| 5,483,656 A | 1/1996 | Oprescu et al. |
| 5,488,657 A | 1/1996 | Lynn et al. |
| 5,495,594 A | 2/1996 | MacKenna et al. |
| 5,497,067 A | 3/1996 | Shaw |
| 5,514,859 A | 5/1996 | Seigel |
| 5,522,081 A | 5/1996 | Carls |
| 5,551,044 A | 8/1996 | Shah et al. |
| 5,553,245 A | 9/1996 | Su et al. |
| 5,559,502 A | 9/1996 | Schutte |
| 5,566,296 A | 10/1996 | Ohmori et al. |
| 5,574,859 A | 11/1996 | Yeh |
| 5,577,213 A | 11/1996 | Avery et al. |
| 5,579,531 A | 11/1996 | Sugita |
| 5,586,268 A | 12/1996 | Chen et al. |
| 5,586,271 A | 12/1996 | Parrett |
| 5,590,312 A | 12/1996 | Marisetty |
| 5,598,409 A | 1/1997 | Madonna et al. |
| 5,603,040 A | 2/1997 | Frager et al. |
| 5,606,672 A | 2/1997 | Wade |
| 5,606,704 A | 2/1997 | Pierce et al. |
| 5,610,601 A | 3/1997 | Lahti et al. |
| 5,615,344 A | 3/1997 | Corder |
| 5,628,029 A | 5/1997 | Evoy |
| 5,634,074 A | 5/1997 | Devon et al. |
| 5,655,148 A | 8/1997 | Richman et al. |
| 5,671,355 A | 9/1997 | Collins |
| 5,673,031 A | 9/1997 | Meier |
| 5,675,770 A | 10/1997 | Johansson |
| 5,675,813 A | 10/1997 | Holmdahl |
| 5,687,346 A | 11/1997 | Shinohara |
| 5,689,196 A | 11/1997 | Schutte |
| 5,701,429 A | 12/1997 | Legvold et al. |
| 5,774,013 A | 6/1998 | Groe |
| 5,787,014 A | 7/1998 | Hall et al. |
| 5,790,331 A | 8/1998 | Aranovsky |
| 5,794,032 A | 8/1998 | Leyda |
| 5,794,033 A | 8/1998 | Aldebert et al. |
| 5,796,276 A | 8/1998 | Phillips et al. |
| 5,796,278 A | 8/1998 | Osborn et al. |
| 5,799,196 A | 8/1998 | Flannery |
| 5,802,558 A | 9/1998 | Pierce |
| 5,818,780 A | 10/1998 | Manning |
| 5,838,907 A | 11/1998 | Hansen |
| 5,847,372 A | 12/1998 | Kreft |
| 5,884,086 A | 3/1999 | Amoni et al. |
| 5,898,861 A | 4/1999 | Emerson et al. |
| 5,905,389 A | 5/1999 | Alleven |
| 5,912,569 A | 6/1999 | Alleven |
| 5,922,056 A | 7/1999 | Amell et al. |
| 5,929,664 A | 7/1999 | Alleven |
| 5,931,933 A | 8/1999 | Billheimer et al. |
| 5,937,201 A | 8/1999 | Matsushita et al. |
| 5,938,770 A | 8/1999 | Kim |
| 5,952,733 A | 9/1999 | Johnston |
| 5,963,057 A | 10/1999 | Schmitt et al. |
| 5,982,879 A | 11/1999 | Lucey |
| 6,000,042 A | 12/1999 | Henrie |
| 6,009,034 A | 12/1999 | Manning |
| 6,012,103 A | 1/2000 | Sartore et al. |
| 6,032,178 A | 2/2000 | Bacigalupo et al. |
| 6,038,667 A | 3/2000 | Helbig, Sr. |
| 6,040,714 A | 3/2000 | Klein |
| 6,040,792 A | 3/2000 | Gilbert et al. |
| 6,049,870 A | 4/2000 | Greaves |
| 6,058,026 A | 5/2000 | Rozman |
| 6,064,554 A | 5/2000 | Kim |
| 6,065,096 A | 5/2000 | Day et al. |
| 6,067,589 A | 5/2000 | Mamata |
| 6,070,211 A | 5/2000 | Neal et al. |
| 6,072,681 A | 6/2000 | Cogan et al. |
| 6,073,193 A | 6/2000 | Yap |
| 6,094,040 A | 7/2000 | Meier et al. |
| 6,101,076 A | 8/2000 | Tsai et al. |
| 6,105,097 A | 8/2000 | Larky et al. |
| 6,124,750 A | 9/2000 | Alleven et al. |
| 6,128,673 A | 10/2000 | Aronson et al. |
| 6,131,134 A | 10/2000 | Huang et al. |
| 6,137,188 A | 10/2000 | Mitchell et al. |
| 6,148,346 A | 11/2000 | Hanson |
| 6,151,645 A | 11/2000 | Young et al. |
| 6,168,077 B1 | 1/2001 | Gray et al. |
| 6,170,062 B1 | 1/2001 | Henrie |
| 6,195,593 B1 | 2/2001 | Nguyen |
| 6,240,522 B1 | 5/2001 | Stufflebeam |
| 6,249,825 B1 | 6/2001 | Sartore et al. |
| 6,266,731 B1 | 7/2001 | Riley et al. |
| 6,308,215 B1 * | 10/2001 | Kolbet et al. ............... 709/233 |
| 6,311,245 B1 | 10/2001 | Klein |
| 6,311,287 B1 | 10/2001 | Dischler et al. |
| 6,334,160 B1 | 12/2001 | Emmert et al. |
| 6,336,152 B1 | 1/2002 | Richman et al. |
| 6,345,370 B1 | 2/2002 | Kwon |
| 6,357,011 B2 * | 3/2002 | Gilbert ....................... 713/300 |
| 6,389,494 B1 | 5/2002 | Walton et al. |
| 6,389,560 B1 | 5/2002 | Chew |
| 6,393,588 B1 | 5/2002 | Hsu et al. |
| 6,400,715 B1 | 6/2002 | Beaudoin et al. |
| 6,408,351 B1 | 6/2002 | Hamdi et al. |
| 6,415,342 B1 | 7/2002 | Wahl et al. |
| 6,439,464 B1 | 8/2002 | Fruhauf et al. |
| 6,442,734 B1 | 8/2002 | Hanson et al. |
| 6,460,094 B1 | 10/2002 | Hanson et al. |
| 6,493,084 B1 | 12/2002 | Friend et al. |
| 6,502,146 B1 | 12/2002 | Rasmussen et al. |
| 6,502,212 B1 | 12/2002 | Coyle et al. |
| 6,510,532 B1 | 1/2003 | Pelly et al. |
| 6,535,938 B1 | 3/2003 | Teramura et al. |
| 6,541,879 B1 | 4/2003 | Wright |
| 6,549,966 B1 * | 4/2003 | Dickens et al. .............. 710/300 |
| 6,584,519 B1 | 6/2003 | Russell |
| 6,625,761 B1 | 9/2003 | Sartore et al. |
| 6,671,831 B1 | 12/2003 | Sartore |
| 6,691,201 B1 | 2/2004 | Williams et al. |
| 6,708,247 B1 * | 3/2004 | Barret et al. ................ 710/313 |
| 6,735,640 B1 * | 5/2004 | Kawabe ...................... 710/14 |
| 6,754,725 B1 | 6/2004 | Wright et al. |
| 6,813,672 B1 | 11/2004 | Kamran et al. |
| 6,820,160 B1 | 11/2004 | Allman |
| 6,839,778 B1 | 1/2005 | Sartore et al. |
| 6,947,075 B1 * | 9/2005 | Niikawa ................ 348/211.14 |
| 7,073,006 B2 * | 7/2006 | Nguyen ...................... 710/260 |
| 2003/0065714 A1 * | 4/2003 | Wong et al. ................. 709/203 |

FOREIGN PATENT DOCUMENTS

| | | | |
|---|---|---|---|
| WO | WO 96/14305 | A1 | 5/1996 |
| WO | WO 97/36230 | A1 | 10/1997 |
| WO | WO 98/34376 | A1 | 6/1998 |

| | | | |
|---|---|---|---|
| WO | WO 99/09712 A1 | 2/1999 | |
| WO | WO 99/49415 A1 | 9/1999 | |

OTHER PUBLICATIONS

Wiener, Paul and Witham, Jim, "Meeting USB and IEEE 1394 Overcurrent Protection Requirements Using Polyswitch Devices," Nov. 1997, IEEE, pp. 442-475.*
USPTO Notice of Allowance for U.S. Appl. No. 09/592,206 dated May 6, 2003; 7 pages.
USPTO Non-Final Rejection for U.S. Appl. No. 09/592,206 dated Jan. 29, 2003; 8 pages.
USPTO Notice of Allowance for U.S. Appl. No. 09/598,561 dated Oct. 1, 2003; 8 pages.
USPTO Non-Final Rejection for U.S. Appl. No. 09/598,561 dated May 27, 2003; 10 pages.
USPTO Notice of Allowance for U.S. Appl. No. 09/592,201 dated Aug. 11, 2003; 4 pages.
USPTO Final Rejection for U.S. Appl. No. 09/592,201 dated Aug. 20, 2003; 6 pages.
USPTO Non-Final Rejection for U.S. Appl. No. 09/592,201 dated Feb. 3, 2003; 8 pages.
USPTO Notice of Allowance for U.S. Appl. No. 09/590,831 dated Aug. 18, 2004; 4 pages.
USPTO Non-Final Rejection for U.S. Appl. No. 09/590,831 dated Jan. 8, 2004; 6 pages.
USPTO Advisory Action for U.S. Appl. No. 09/590,831 dated Aug. 19, 2003; 3 pages.
USPTO Final Rejection for U.S. Appl. No. 09/590,831 dated Apr. 24, 2003; 11 pages.
USPTO Non-Final Rejection for U.S. Appl. No. 09/590,831 dated Feb. 12, 2003; 9 pages.
USPTO Notice of Allowance for U.S. Appl. No. 09/791,355 dated May 26, 2004; 4 pages.
USPTO Non-Final Rejection for U.S. Appl. No. 09/791,355 dated Feb. 12, 2004; 9 pages.
USPTO Non-Final Rejection for U.S. Appl. No. 09/791,355 dated Nov. 6, 2003; 10 pages.
USPTO Notice of Allowance for U.S. Appl. No. 09/816,963 dated Nov. 14, 2002; 5 pages.
USPTO Advisory Action for U.S. Appl. No. 09/816,963 dated Aug. 19, 2002; 2 pages.
USPTO Final Rejection for U.S. Appl. No. 09/816,963 dated May 29, 2002; 4 pages.
USPTO Non-Final Rejection for U.S. Appl. No. 09/816,963 dated Dec. 19, 2001; 7 pages.
USPTO Notice of Allowance for U.S. Appl. No. 08/839,981 dated Nov. 9, 1999; 4 pages.
USPTO Non-Final Rejection for U.S. Appl. No. 08/839,981 dated Jun. 9, 1999; 6 pages.
USPTO Non-Final Rejection for U.S. Appl. No. 08/839,981 dated Nov. 4, 1998; 6 pages.
USPTO Non-Final Rejection for U.S. Appl. No. 08/839,981 dated May 28, 1998; 7 pages.
USPTO Notice of Allowance for U.S. Appl. No. 08/934,933 dated Dec. 21, 1998; 5 pages.
USPTO Non-Final Rejection for U.S. Appl. No. 08/934,933 dated Sep. 16, 1998; 6 pages.
USPTO Notice of Allowance for U.S. Appl. No. 08/934,805 dated Dec. 21, 1998; 3 pages.
USPTO Non-Final Rejection for U.S. Appl. No. 08/934,805 dated Sep. 23, 1998; 6 pages.
USPTO Notice of Allowance for U.S. Appl. No. 08/935,350 dated Jan. 11, 1999; 6 pages.
USPTO Non-Final Rejection for U.S. Appl. No. 08/935,350 dated Sep. 21, 1998; 10 pages.
USPTO Notice of Allowance for U.S. Appl. No. 08/995,494 dated Oct. 14, 1999; 3 pages.
USPTO Final Rejection for U.S. Appl. No. 08/995,494 dated Jul. 12, 1999; 7 pages.
USPTO Non-Final Rejection for U.S. Appl. No. 08/995,494 dated May 14, 1999; 6 pages.
USPTO Notice of Allowance for U.S. Appl. No. 09/850,468 dated Feb. 20, 2004; 3 pages.
USPTO Non-Final Rejection for U.S. Appl. No. 09/850,468 dated Sep. 4, 2003; 6 pages.
USPTO Notice of Allowance for U.S. Appl. No. 09/935,017 dated Jun. 21, 2004; 6 pages.
USPTO Non-Final Rejection for U.S. Appl. No. 09/935,017 dated Feb. 6, 2004; 6 pages.
IBM Personal System/2 Mouse Technical Reference, Second Edition, Jun. 1989; 36 pages.
U.S. Appl. No. 09/592,201: "Fault Tolerant USB Method and Apparatus," Sartore et al., filed on Jun. 9, 2000; 26 pages.
U.S. Appl. No. 08/934,805: "Methods, Circuits, and Devices for Improving Crossover Performance and/or Monotonicity, and Applications of the Same in a Universal Serial Bus (USB) Low Speed Output Driver," Gary W. Alleven; filed on Sep. 22, 1997; 42 pages.
U.S. Appl. No. 08/935,350: "Methods, Circuits, and Devices for Improving Crossover Performance and/or Monotonicity, and Applications of the Same in a Universal Serial Bus (USB) Low Speed Output Driver," Gary W. Alleven; filed on Sep. 22, 1997; 42 pages.
"Design Guide for a Low Speed Buffer for the Universal Serial Bus," Revision 1.1, Dec. 1996, Intel Corporation; pp. 1-29; 33 pages.
Universal Serial Bus Specification, Chapter 7 - Electrical, Version 1.0; Jan. 15, 1996, pp. 111-143; 34 pages.
U.S. Appl. No. 08/934,933: "Methods, Circuits, and Devices for Improving Crossover Performance and/or Monotonicity, and Applications of the Same in a Universal Serial Bus (USB) Low Speed Output Driver," Gary W. Alleven; filed Sep. 22, 1997; 44 pages.
"http://www.silicom.co.il/news/201100usb.htm," Silicom Ltd. Connectivity Solutions; 3 pages.
"http://www.silicom.co.il/news/130801u2es.htm," Silicom Ltd. Connectivity Solutions; 3 pages.
Chikamura et al., "An Intelligent IEEE 1394 Hub Architecture," 2002; 2 pages (abstract only).
Schweitzer et al., "Improved Sensitivity and Security for Distribution and Feeder Relays," May 1993; 1 page (abstract only).
Universal Serial Bus (USB), Device Class Definition for Human Interface Devices (HID), Version 1.1, Apr. 7, 1999, pp. 1-87; 94 pages.
International Search Report for International Application No. PCT/EP99/02051 dated Sep. 27, 1999; 3 pages.
International Search Report from the International Searching Authority for International Application No. PCT/US97/04032 dated Jul. 11, 1997; 3 pages.
International Search Report for International Application No. PCT/IB98/02059 mailed Oct. 7, 1999; 3 pages.
International Search Report for International Application No. PCT/EP95/04154 mailed Dec. 28, 1995; 3 pages.
International Search Report for International Application No. PCT/IB98/00041 mailed Jul. 31, 1998; 2 pages.
Universal Serial Bus Specification, Revision 2.0, Apr. 27, 2000; 622 pages.
Universal Serial Bus Specification, Revision 1.1, Sep. 23, 1998; 311 pages.

* cited by examiner

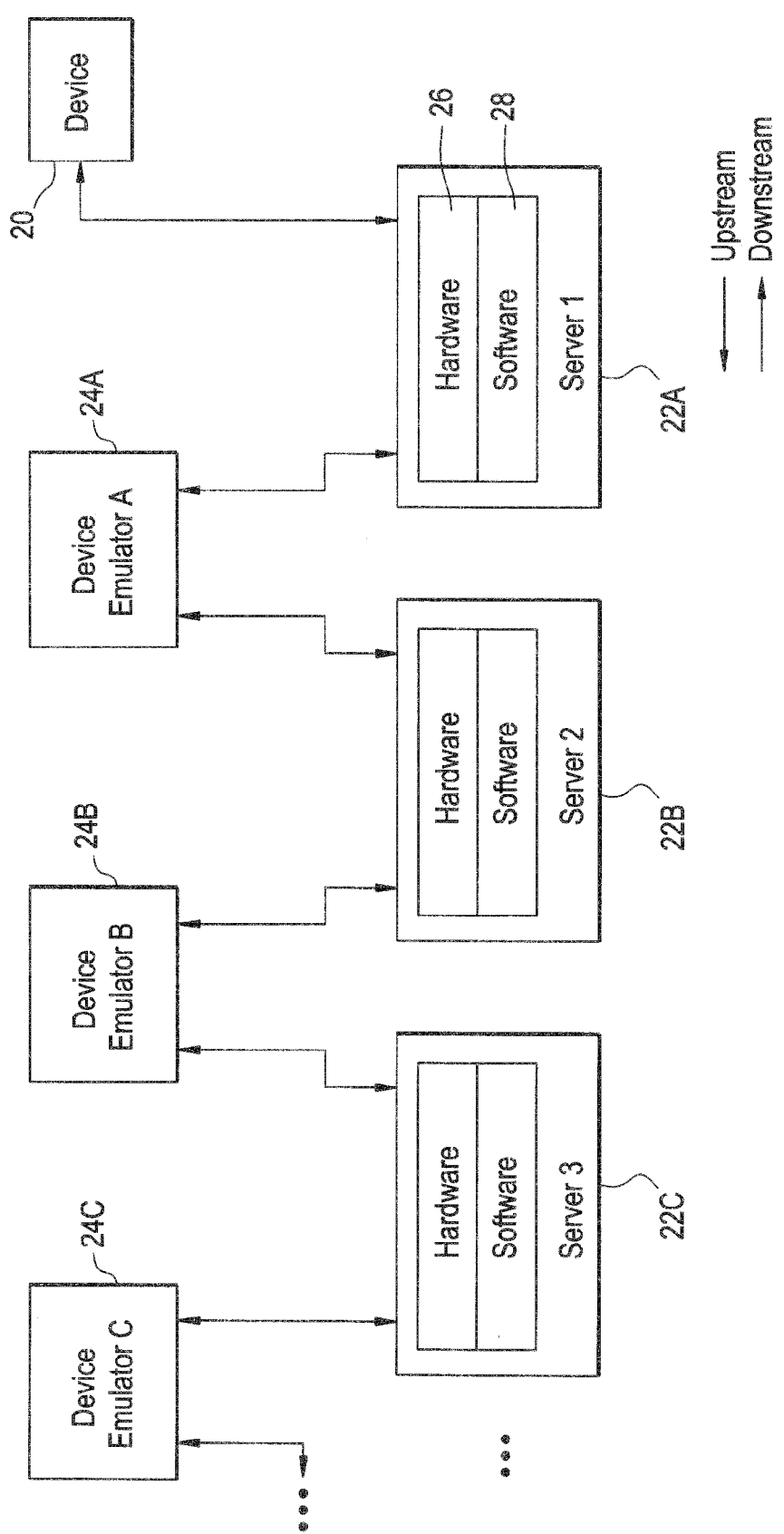

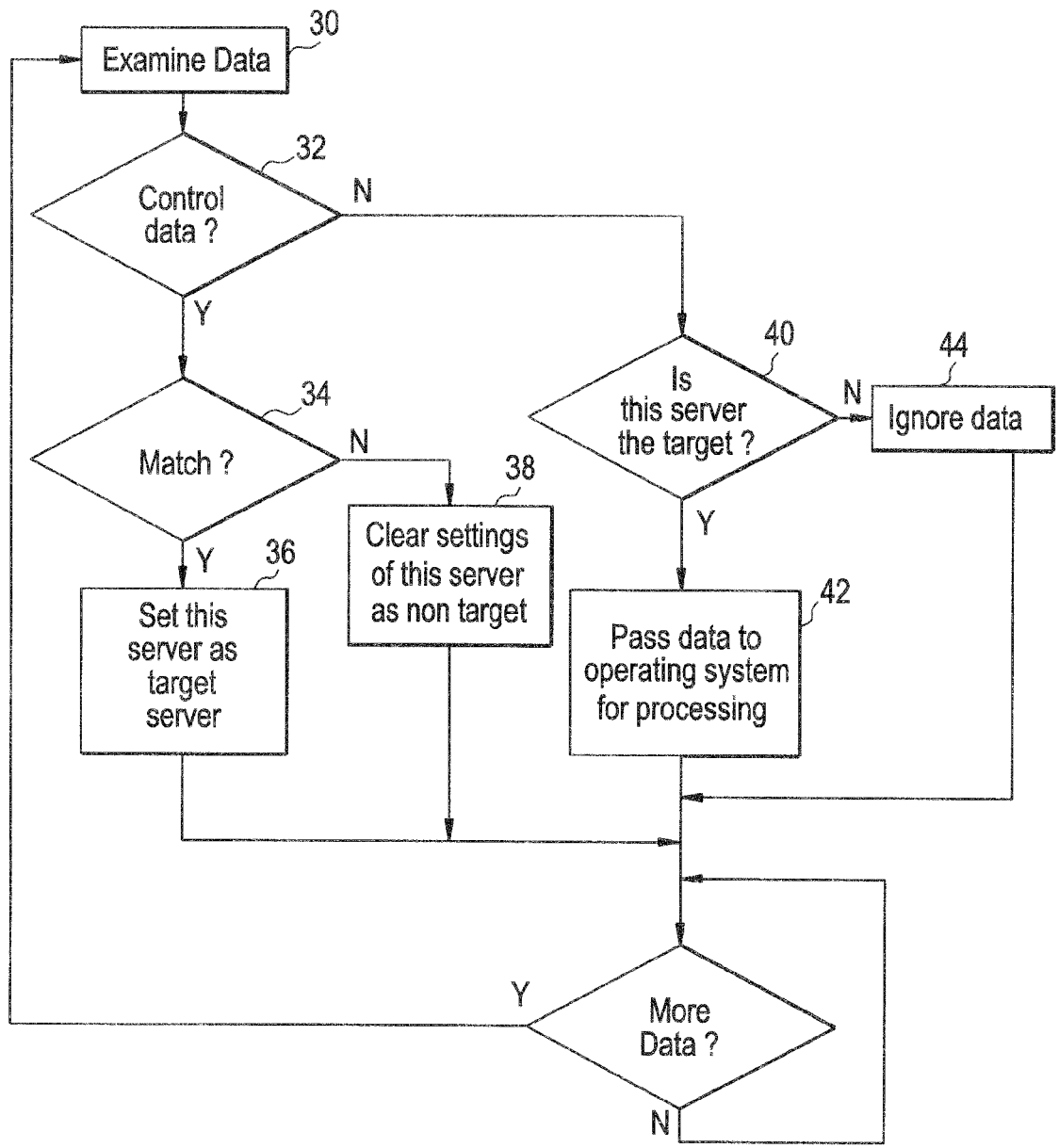

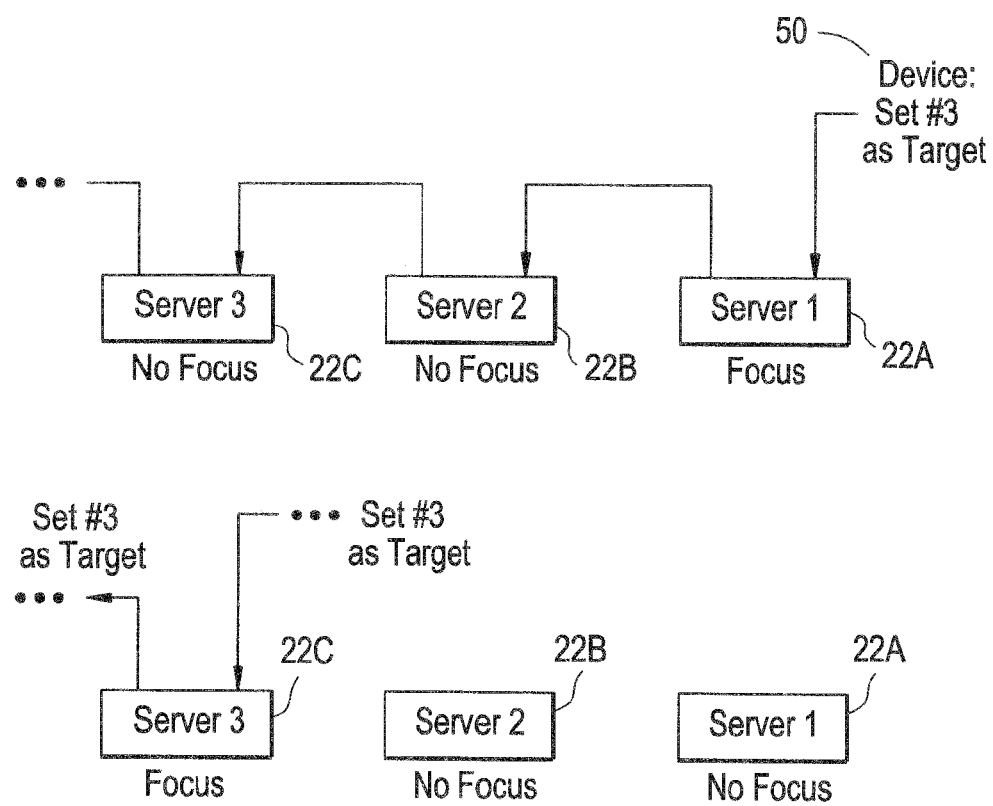

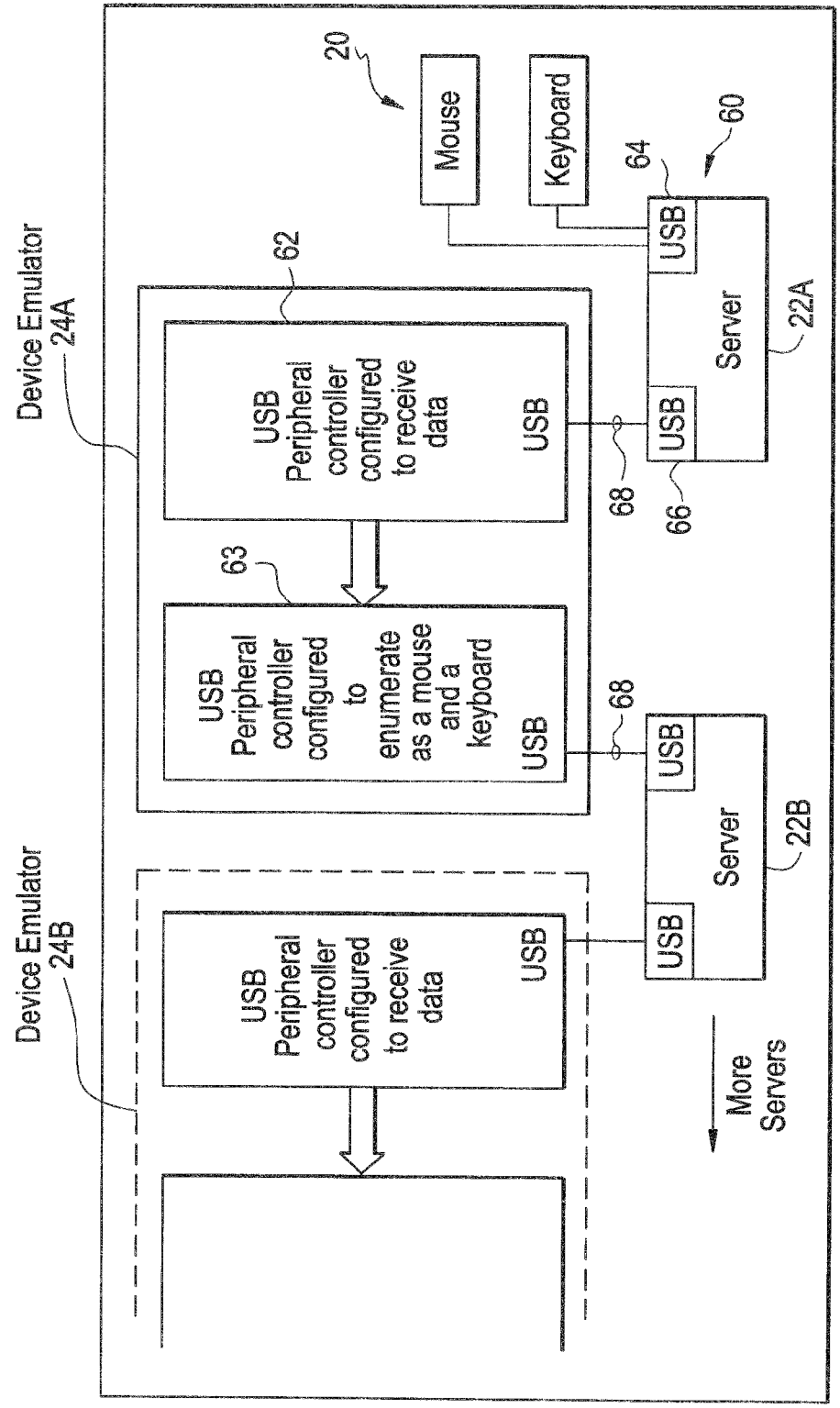

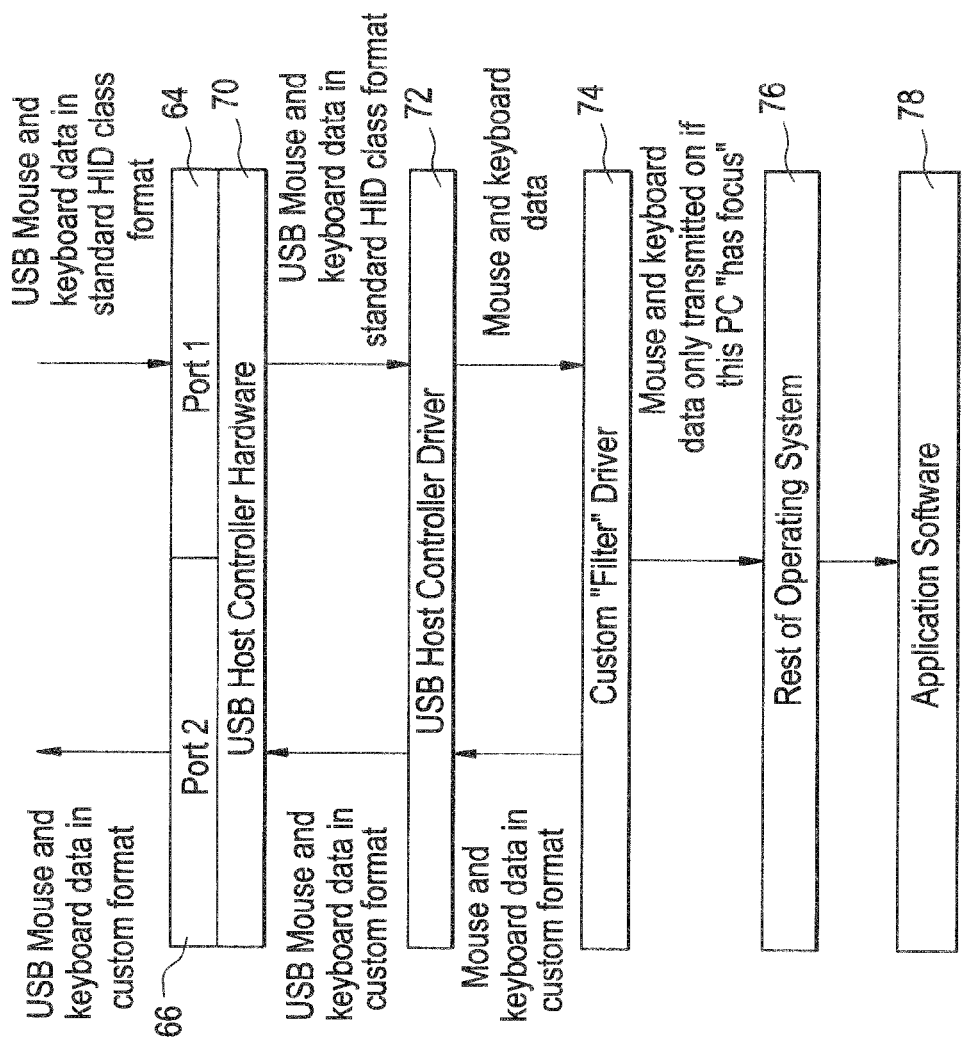

APPARATUS, SYSTEM AND METHOD FOR SHARING DATA FROM A DEVICE BETWEEN MULTIPLE COMPUTERS

TECHNICAL FIELD

This application relates, in general, to sharing data from one or more peripheral devices by one or more computers or servers.

BACKGROUND

Computing environments using multiple servers to provide data and services to users have proliferated due to the growth of networked computer systems such as the Internet. Server farms have been developed to include multiple servers typically located in a single or common area for providing programs or data to end users. A server farm—also referred to as a server cluster, computer farm, or server ranch—is a group of networked servers that are housed or located in one location. In the context of the Internet, a Web server farm, or Web farm, includes a Web site that runs off of more than one server, or an ISP that provides Web hosting services using multiple servers. An example of a server farm may include a rack of servers (i.e., 100 computers or servers) for website hosting.

Generally, a server farm distributes computing workloads between the individual servers or components of the farm, and speeds computing processes through the use of multiple servers. A server farm may use load-balancing software for tracking, prioritizing and scheduling processing requests depending on priority and present demand. If a server in the farm fails, another server can act as a backup. In this way, a server farm can be used to process a large amount of requests for data or services by multiple users in a network.

The servers of a server farm may be physically positioned together using a racking system or other means to compactly locate multiple servers in a single area. A system administrator of the server farm may monitor the operations of each server in the server farm. The system administrator may also configure, or perform other administration functions, one or more of the servers in the server farm.

In a server farm, it is inconvenient for each server to have a dedicated mouse and keyboard attached. A KVM (keyboard, video, mouse) switch is typically provided in such an environment so that a keyboard and mouse can be shared between servers. A KVM switch typically uses a star topology arrangement which requires multiple cables from each server be connected to a KVM switch. However, such a star topology requires a large amount of cabling where there are a large number of servers needing to share a keyboard and mouse, and because the KVM switch, the mouse and the keyboard are typically located away from the servers.

As recognized by the present inventors, what is needed is an apparatus, system and/or method for sharing data from a peripheral device between multiple computers or servers, such as in a server farm where a single keyboard and mouse may be shared by multiple servers.

It is against this background that various embodiments of the present invention were developed.

SUMMARY

According to one broad aspect of one embodiment of the invention, disclosed herein is an apparatus for connecting a first computer to a second computer in order to share data from a peripheral device coupled with the first computer. The apparatus may include a first USB peripheral controller configured to receive data from the first computer, and a second USB peripheral controller coupled with the first USB peripheral controller to receive data therefrom, the second USB peripheral controller configured to be coupled with the second computer. The second USB peripheral controller may be adapted to pass the data which originated from the peripheral device to the second computer in a format used by the peripheral device. In this manner, the data from the device is shared by the first and second computers, as if the second computer has been connected to the device.

In one example, the first and second USB peripheral controllers may be encased in a cable or made integral to a housing of a USB plug.

According to another broad aspect of one embodiment of the invention, disclosed herein is a method of sharing device data from a peripheral device by at least a first and a second computer where the peripheral device coupled with the first computer. The method includes providing a device emulator coupled between the first computer and the second computer, the device emulator adapted to pass the device data from the first computer to the second computer in a format used by the peripheral device. Device data is received at the first computer, and it is determined whether the device data should be processed by the first computer, and the device data is passed to the device emulator for transmission to the second computer. The determining operation may examine whether the first computer is the intended target of device data. The method may also include receiving the device data at the device emulator, encoding the device data in a format used by the peripheral device, and transmitting the device data in the format to the second computer. In this manner, the data from the device is shared by the first and second computers, as if the second computer has been connected to the device.

According to another broad aspect of one embodiment of the invention, disclosed herein is a method of sharing device data from a peripheral device by a plurality of computers including a first, second, and third computer where the peripheral device coupled with the first computer. In one embodiment, the method includes providing a first device emulator coupled between the first computer and the second computer where the first device emulator is adapted to pass the device data from the first computer to the second computer in a format used by the peripheral device; and providing a second device emulator coupled between the second computer and the third computer, where the second device emulator is adapted to pass the device data from the second computer to the third computer in a format used by the peripheral device. Data from the device is received at the first computer, and it is determined whether the device data should be processed by the first computer. The device data is passed to the first device emulator for transmission to the second computer.

The method may also include receiving the device data at the first device emulator; encoding the device data in a format used by the peripheral device; transmitting the device data in the format to the second computer; receiving the device data at the second computer; determining whether the device data should be processed by the second computer; and passing the device data to the second device emulator for transmission to the third computer. In another embodiment, a control data signal is generated indicating whether the device data is intended for the first computer, the second computer, or the third computer, and the control data signal is transmitted to the first, second, and third computers.

The method may also include providing a first software interface in the first computer for processing the device data, the first software interface examining the control data signal in order to determine whether the device data should be processed by the first computer; providing a second software interface in the second computer for processing the device data, the second software interface examining the control data signal in order to determine whether the device data should be processed by the second computer; and providing a third software interface in the third computer for processing the device data, the third software interface examining the control data signal in order to determine whether the device data should be processed by the third computer.

In one embodiment, the operation of providing a device emulator may include providing a first USB peripheral controller configured to receive data from the first computer; and providing a second USB peripheral controller coupled with the first USB peripheral controller to receive data therefrom, the second USB peripheral controller configured to be coupled with the second computer, the second USB peripheral controller adapted to pass the data which originated from the peripheral device to the second computer in a format used by the peripheral device.

According to another broad aspect of one embodiment of the invention, disclosed herein is a system for sharing data from a peripheral device. In one embodiment, the system may include a first computer coupled with the peripheral device, a second computer, and a first device emulator coupled between the first computer and the second computer, wherein the first device emulator is adapted to pass the data which originated from the peripheral device from the first computer to the second computer in a format used by the peripheral device. The first and second computers may be connected in a daisy chain arrangement using the device emulator.

In one embodiment, the first computer may include a first software interface for processing the device data, the first software interface determining whether the data from the peripheral device should be processed by the first computer, wherein the second computer further comprises a second software interface for processing the data, the second software interface determining whether the data should be processed by the second computer. In one example, the first software interface passes the data from the peripheral device to an operating system portion of the first computer if the data from the peripheral device should be processed by the first computer, or the first software interface ignores the data from the peripheral device if the data from the peripheral device should not be processed by the first computer.

In one embodiment, the first computer may include a first hardware port configured to receive the data from the peripheral device and a second hardware port configured to transmit to the first device emulator the data received from the peripheral device over the first hardware port. The first hardware port may be a USB port and the second hardware port may be a USB port, or the first hardware port may be a PS/2 port and the second hardware port may be a USB port.

In one example, the first device emulator may include a first USB peripheral controller configured to receive data from the first computer and a second USB peripheral controller coupled with the first USB peripheral controller to receive data therefrom, the second USB peripheral controller coupled with the second computer, the second USB peripheral controller adapted to pass the data which originated from the peripheral device to the second computer in a format used by the peripheral device. The first and second USB peripheral controllers may be encased in a cable, or integral to a housing of a USB plug.

The foregoing and other features, utilities and advantages of the invention will be apparent from the following more particular description of various embodiments of the invention as illustrated in the accompanying drawings and claims.

DESCRIPTION OF THE DRAWINGS

FIG. 1 illustrates a block diagram of a device coupled with a plurality of servers interconnected through device emulators, in accordance with one embodiment of the present invention.

FIG. 2 illustrates a flow diagram of one embodiment of the logical operations performed by a software interface, in accordance with one embodiment of the present invention.

FIG. 3 illustrates an example of the changing the target computer/server to receive the data from the device, in accordance with one embodiment of the present invention.

FIG. 4 illustrates a block diagram of a mouse and keyboard device coupled with a plurality of servers interconnected through device emulators, in accordance with one embodiment of the present invention.

FIG. 5 illustrates the layers of a computer/server for processing data received, in accordance with one embodiment of the present invention.

FIG. 6 illustrates a data flow diagram of the interaction of the various layers of a computer/server shown in FIG. 5, in accordance with one embodiment of the present invention.

DETAILED DESCRIPTION

According to one broad aspect of the invention, disclosed herein is an apparatus, system and method for sharing data from one or more peripheral devices, such as USB devices, between multiple servers or computers, such as USB hosts. Various embodiments of the invention will now be discussed.

FIG. 1 shows one embodiment of the present invention, wherein a device 20 is connected with a plurality of servers 22A, B, C which are interconnected by device emulators 24A, B, C capable of passing data between adjacent servers. In one embodiment, the servers 22A, B, C are arranged in a daisy chain arrangement with a device emulator 24 connecting adjacent servers, the device emulator 24 capable of passing data from one server to the adjacent server in a manner that emulates the device 20. Further, each server 22 is provided with a hardware interface 26 for communicating with the device 20 or with a device emulator 24, and each server is provided with a software interface 28 for filtering and processing data received by the hardware interface 26, as will be described below, to determine whether data received should be further processed by the server. In one embodiment, data from the device 20 is broadcast to all servers 24 connected, and the server which has been selected as the target for the data further processes the data. A command message or control data can be passed from the device (or elsewhere) to the servers to set or change the target server selected. In this manner, data from a device or peripheral 20 can be passed amongst multiple servers 22A, B, C, and the server which the data is intended for (referred to herein as the targeted server which has "focus" or is targeted to receive the data) can then further process the data as if the device 20 had been connected directly to the targeted server.

In overall operation and referring to FIG. 1, when the device 20—such as a keyboard or mouse or other peripheral—provides data upstream to server 22A, the hardware interface 26 of server 22A receives the data and the software interface 26 of server 22A determines whether the data is intended for server 22A. If so, the software interface 28 of server 22A passes the data to the operating system of server 22A for processing therein. If the data is not intended for server 22A, then the data is passed by the hardware interface 26 of server 22A to device emulator 24A which receives the data from server 22A and transmits the data to server 22B in a format that emulates the device 20. Server 22B receives the emulated data and, in a manner similar to server 22A, determines whether the emulated data is intended for server 22B, and if so, passes the data to the operating system of server 22B for processing therein. If the emulated data was not intended for server 22B, then the emulated data is passed to device emulator 24B, which receives the data and transmits the data to server 22C in a format which emulates the device 20. It can be seen that through the use of the device emulators 24A, B, C and the software interface 28 provided at the servers 22A, B, C, the data originating from the device 20 can be shared by multiple servers so that the intended targeted server can receive and process the data from the device 20, as if the device 20 had been connected directly to the targeted server.

While FIG. 1 illustrates a single device 20 and three or more servers 22A, B, C interconnected with three or more device emulators 24A, B, C, it is understood that a plurality of servers could be interconnected using a plurality of device emulators. Further, it is understood that the device emulators 24A, B, C shown in FIG. 1 could be adapted to emulate various types of devices 20, such as a keyboard, mouse, an input device, or any other peripheral which provides data that is selectively directed to one or more servers. Further, as shown in FIG. 1, data can be transmitted in an "upstream" direction from the device 20 to the servers 22A, B, C (i.e., from the device 20 to server 22A through device Emulator 24A to server 22B through device emulator 24B to server 22C, etc.), or data can be transmitted in a "downstream" direction from the servers to the device 20 (i.e., from server 22C through device emulator 24B to server 22B through device emulator 24A to server 22A to the device 20), or both, depending upon the particular implementation desired.

In accordance with one embodiment of the invention, each server 22 is provided with a software interface 28. The software interface 28, in one embodiment, examines the data received at the server 22 and determines whether the data should be passed up to the operating system of the server 22. One example of the logical operations performed by the software interface 28 is illustrated in FIG. 2. At operation 30 of FIG. 2, when data is received by the software interface, the data is examined and at operation 32, it is determined whether the data contains control information (i.e., focus command data) relating to the control or selection of the intended server to be the target server. In one embodiment, once a server has been selected as the targeted server, all subsequent data passed from the device is made available to the targeted server and processed therein, until a time when a different server is selected as the targeted server.

For instance, in the example of FIG. 1, if server 22C has been selected by a user operating a keyboard 20, then all subsequent keyboard data which the user provides is passed to server 22C for processing by server 22C, until the user changes the selection of the server intended to be the target server. In one embodiment, a special key combination followed by a server number can be utilized by a user of a keyboard 20 to select which server is to be targeted for processing subsequent data. For example, the key sequence of "Ctrl-Alt-2" would select server 22C as the targeted server in one embodiment.

Referring operation 32 of FIG. 2, if the received data contains control data specifying a target server, then decision operation 34 examines the control data and determines whether there is a match with the present server. In other words, decision operation 34 determines whether the present server has been selected to be the targeted server for receiving data. If so, then operation 36 sets this server as the targeted server having focus for receiving data. If, at operation 34, the control data examined does not specify the present server, then the present server has not been selected as the targeted server. In one embodiment, operation 38 clears any state flags or settings in the present server which may have indicated that the present server was the targeted server.

If decision operation 32 examines the data and determines that the data is not control data (i.e., the data is device data), then operation 40 determines whether the present server currently is the target or focus for the received data (i.e., the present server is the targeted server). If so, operation 42 passes the data to the operating system of the present server for processing therein. In one embodiment, operations 32-34 are performed by a software interface or filter provided in the server. In this manner, the targeted server receives and acts upon the received data, if appropriate. If the present server is not currently the targeted server, then at operation 44, the server ignores the received data. As can be seen in FIG. 2, the logical operations are repeated for each piece of data received by a server.

FIG. 3 illustrates an example of the changing of focus (changing the target server) from server 22A to server 22C, in accordance with the example logical operations shown in FIG. 2, in accordance with one embodiment of the present invention. As shown in FIG. 3, server 22A receives a command 50 indicating that the targeted server should be set to server 22C, in this example. When server 22A receives this command, its software interface 28 examines the data and determines that there is control data present, however, the control data does not specify server 22A as the selected target server. Because server 22A presently has focus, but the command received indicates that another server is to be the target server, server 22A no longer has focus and will therefore ignore any subsequent data it receives until a later time if server 22A is again selected to be the target server.

The command 50 is passed from server 22A to server 22B, and server 22B examines the data and determines that the command does not specify server 22B to be the target. The command 50 is passed from server 22B to server 22C, and server 22C examines the command data. Server 22C determines that the command 50 specifies that server 22C should be the target or focus for subsequent data. Accordingly, server 22C sets any required flags or settings in its software interface so that subsequent data received by server 22C is passed to the operating system of server 22C. In one embodiment and as shown in FIG. 3, server 22C passes the command upstream to other servers which may be connected in the system so that each server in the system receives the command and can take any action as needed (i.e., clearing any settings for a server if needed). Now that server 22C has received the command, server 22C will process any received data by passing the data to its operating system for processing therein, until a time when another command is received by server 22C which changes the target or focus from server 22C to another server in the system.

Referring now to FIG. 4, FIG. 4 illustrates one embodiment of the invention wherein the servers 22A, B are provided with USB (Universal Serial Bus) hardware interfaces 60, and the device emulator 24A, B includes one or more USB peripheral controllers 62. In this embodiment, the servers 22A, B act as USB host computers, and the device 20 acts as a USB peripheral. In one embodiment, a server 22 has a hardware interface 60 including two USB ports 64, 66. A first USB port 64 is configured to receive data from a device 20, and a second USB port 66 is configured to transmit data to the device emulator 24A. While the embodiment of FIG. 4 shows each server having two USB hardware interfaces 64, 66, it is understood that other hardware interfaces could be used as needed in the particular implementation. For instance, the first server 22A could utilize a PS/2 interface to receive data from the device 20 (i.e., a PS/2 keyboard or PS/2 mouse), and the software interface provided in the server 22A could handle any format conversions to transmit the data in a USB format. In one example, full speed USB is used for the links 68 between the host server computers in order to limit the propagation delay of the data being transmitted along the daisy chain.

As shown in FIG. 4, in one embodiment the device emulator 24A includes a first USB peripheral controller 62 configured to receive data, such as a programmable microcontroller capable of full speed USB applications, and a second USB peripheral 63 controller configured to emulate the device 20 such as the keyboard or mouse. One example of such a programmable microcontroller 62, 63 is the CY7C64013 microcontroller offered by Cypress Semiconductor Corporation of San Jose, Calif. It is understood that the device emulator 24A could be implemented using other devices depending upon the particular application.

In one embodiment, the first USB peripheral controller 62 is coupled with the second peripheral controller 63, as shown in FIG. 4. These controllers 62, 63 can be positioned on a single circuit board and encased in a cable sheath so that, along with the USB cables into and out of the device emulator 24A, the connection 68 between the servers merely appears as a simple cable.

Alternatively, because the package of the USB microcontrollers is small enough, both microcontrollers 62, 63 could be located on a small circuit board formed as part of a USB "A" plug housing, so that a connection 68 between the servers would appear like an "A-A" USB cable. The directionality of the data flow may be auto-sensed by the device emulator 24 so that data may flow in either direction.

The first USB peripheral controller 62 is configured to receive data from a USB hardware interface 66 of the server 22A. The data from the USB hardware interface includes the device data being passed from the server 22A to the next server 22B in the daisy chain. The first USB peripheral controller 62 receives this data and passes this data to the second USB peripheral controller 63. The second USB peripheral controller 63 receives this data and encodes this data in a format in which the device 20 (i.e., keyboard or mouse) would transmit. In this manner, the second USB peripheral controller 63 emulates the device 20 in its message content and format.

Accordingly, data from the device 20 (i.e., keyboard, mouse, or other peripheral) can be passed from a first server 22A to a second server 22B to other server connected in the system, and the software interfaces provided in the servers 22A, B would determine whether the data should be further processed within a particular server, as if the server had been directly connected with the device 20.

Referring now to FIGS. 5-6, FIGS. 5-6 illustrate a USB host hardware and software model, in accordance with one embodiment of the present invention. This model can be implemented in a server 22 of the system shown in FIG. 4. A USB host controller hardware layer 70 is provided to receive, for example, the USB mouse and keyboard data over a first USB port 64, and a second USB port 66 transmits USB mouse and keyboard data from the server to the next server. The USB host controller hardware layer 70 provides any received data to a USB host controller driver layer 72, shown in FIGS. 5-6.

The USB host controller driver layer 72 is provided which receives the USB mouse and keyboard data from the USB host controller hardware layer 70. The USB host controller driver 72 provides the mouse and keyboard data to a filter driver 74, which in one embodiment performs the logical operations shown in FIG. 2 to examine and filter the received data. As explained above, the filter driver 74 determines whether the received data should be passed to the rest of the operating system 76 for this server, and if so, passes the data to the operating system 76 so that the data can be accessed by an application program 78 operating on the server.

If the device data (i.e., mouse, keyboard) were to be accessible to the servers prior to the loading of the operating system of a server (i.e., during booting), a software interface could be added to the BIOS of the server in order to support the above-describe functionality. Such modifications to the BIOS could include the "boot protocol" mode of a USB host to support functionality prior to the loading of the operating system. Once the operating system has loaded, the BIOS ceases to drive the USB host and the software interface 28 (described above) would be operational to perform any of the operations describe above.

As shown in FIG. 6, the filter driver 74 also provides mouse and keyboard data to the USB host controller driver 72 so that the data can be passed to the next server in the daisy chain through the second port 66 of the USB host controller hardware 60, in one embodiment of the invention. The USB host controller driver 72 encodes the mouse and keyboard data in USB format so that such data can be passed to the USB host controller hardware 70 out to the next server in the system.

While the description and drawings have shown two or three servers 22A, B, C interconnected using device emulators 24A, B, C, it is understood that a different or larger number of servers or host computers could interconnected in a similar manner, depending upon the particular implementation. While embodiments of the invention have been described with reference to a plurality of servers interconnected, it is understood that embodiments of the present invention could also be utilized to share data from one or more devices 20 by a plurality of computers or other host devices. Further, it is understood that while the description and drawings have shown a keyboard and mouse as the device 20 from which data is shared among a plurality of servers, other devices could be used as well. For instance, data could be shared in a manner as described above, where the data originates from devices such as USB floppy disk drives, printers, scanners, digital cameras, data acquisition devices, modems, speakers, telephones or video phones, storage devices such as ZIP drives, or any other peripheral.

Various operations described herein may be embodied as computer program products, such as CDROMs or programmed memories, including a computer usable medium and computer readable code embodied on the computer usable medium, the computer readable code including computer readable program code devices configured to cause a computer to perform or effect one or more of the operations described herein. Further, one or more of the operations or features described herein may be implemented using one or more modules adapted to operate in a computing system.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to a preferred embodiment thereof, it will be understood by those skilled in the art that various other changes in the form and details may be made without departing from the spirit and scope of the invention.

We claim:

1. A method of sharing device data and focus command data from a peripheral device by a plurality of computers including a first, second, and third computer, said peripheral device coupled with the first computer, the method comprising:

providing for coupling the peripheral device to the first computer using a first hardware interface;

providing a first device emulator coupled between and separate from the first computer and the second computer, the first device emulator adapted to pass the device data and focus command data from the first computer to the second computer in a format used by the peripheral device, the first device emulator further comprising, a first USB peripheral controller configured to receive data from the first computer, the first USB peripheral controller configured to be coupled with the first computer, using a first hardware interface of the first computer, the data being originated by the peripheral device and received by the first USB peripheral controller from the first computer, and a second USB peripheral controller coupled with the first USB peripheral controller to receive data therefrom, the second USB peripheral controller configured to be coupled with the second computer using a second hardware interface of the second computer, the second USB peripheral controller configured to encode the data received from the first computer in a format used by the peripheral device and adapted to pass the encoded data which emulates the data that originated from the peripheral device to the second computer through the second hardware interface in the format used by the peripheral device;

providing a second device emulator coupled between and separate from the second computer and the third computer, the second device emulator adapted to pass the device data and focus command data from the second computer to the third computer in a format used by the peripheral device, receiving the device data and focus command data at the first computer;

processing device data and focus command data received from the peripheral device;

determining whether the device data should be processed by the first computer using the focus command data; and passing the device data to the first device emulator for transmission to the second computer if the focus command data identifies a computer different than the first computer.

2. The method of claim 1, further comprising:

receiving the device data at the first device emulator;

encoding the device data in a format used by the peripheral device;

transmitting the device data in the encoded format to the second computer;

receiving the device data at the second computer;

determining whether the device data should be processed by the second computer; and passing the device data to the second device emulator for transmission to the third computer.

3. The method of claim 1, further comprising:

generating a control data signal indicating whether the device data is intended for the first computer, the second computer, or the third computer;

transmitting the control data signal to the first, second, and third computers.

4. The method of claim 3, further comprising:

providing a first software interface in the first computer for processing the device data, the first software interface examining the control data signal in order to determine whether the device data should be processed by the first computer;

providing a second software interface in the second computer for processing the device data, the second software interface examining the control data signal in order to determine whether the device data should be processed by the second computer; and providing a third software interface in the third computer for processing the device data, the third software interface examining the control data signal in order to determine whether the device data should be processed by the third computer.

5. A system for sharing device data and focus command data from a peripheral device, the system comprising:

a first computer coupled with the peripheral device;

a second computer; and a first device emulator coupled between and separate from both the first computer and the second computer, the first device emulator adapted to pass the device data and focus command data which originated from the peripheral device from the first computer to the second computer in a format used by the peripheral device, the first device emulator further comprising, a first USB peripheral controller configured to receive data from the first computer, the first USB peripheral controller configured to be coupled with the first computer using a first hardware interface of the first computer, the data being originated by the peripheral device and received by the first USB peripheral controller from the first computer, and a second USB peripheral controller coupled with the first USB peripheral controller to receive data therefrom, the second USB peripheral controller configured to be coupled with the second computer using a second hardware interface of the second computer, the second USB peripheral controller configured to encode the data received from the first computer in a format used by the peripheral device and adapted to pass the encoded data which emulates the data that originated from the peripheral device to the second computer through the second hardware interface in the format used by the peripheral device;

a third computer having a third software interface for processing the device data and focus command data, the third software interface configured for determining whether the device data should be processed by the second computer using the focus command data; and a second device emulator coupled between the second computer and the third computer, the second device emulator adapted to pass the data which originated from the peripheral device from the second computer to the third computer in a format used by the peripheral device, the second device emulator further comprising, a first USB peripheral controller configured to receive data from the second computer, the first USB peripheral controller configured to be coupled with the second computer using a first hardware interface, the data being originated by the peripheral device and received by the first USB peripheral controller from the second computer, and a second USB peripheral controller coupled with the first USB peripheral controller to receive data therefrom, the second USB peripheral controller configured to be coupled with the third computer using a second hardware interface, the second USB peripheral controller configured to encode the data received from the second computer in a format used by the peripheral device and adapted to pass the encoded data which emulates the data that originated from the peripheral device to the third computer through the second hardware interface in the format used by the peripheral device.

6. The system of claim 5, wherein the first, second, and third computers are connected in a daisy chain arrangement with the first and second device emulators.

* * * * *